United States Patent
Tzirkel-Hancock et al.

(10) Patent No.: US 10,032,453 B2
(45) Date of Patent: Jul. 24, 2018

(54) SYSTEM FOR PROVIDING OCCUPANT-SPECIFIC ACOUSTIC FUNCTIONS IN A VEHICLE OF TRANSPORTATION

(71) Applicant: GM Global Technology Operations LLC, Detroit, MI (US)

(72) Inventors: Eli Tzirkel-Hancock, Ra'Anana (IL); Ilan Malka, Tel Aviv (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/493,910

(22) Filed: Apr. 21, 2017

(65) Prior Publication Data

US 2017/0323639 A1   Nov. 9, 2017

Related U.S. Application Data

(60) Provisional application No. 62/332,824, filed on May 6, 2016.

(51) Int. Cl.
| | |
|---|---|
| *H04M 1/00* | (2006.01) |
| *G10L 15/22* | (2006.01) |
| *B60H 1/00* | (2006.01) |
| *G10L 15/30* | (2013.01) |
| *G10L 17/22* | (2013.01) |
| *H04M 1/60* | (2006.01) |

(Continued)

(52) U.S. Cl.
CPC .......... *G10L 15/22* (2013.01); *B60H 1/00742* (2013.01); *B60H 1/00757* (2013.01); *G10L 15/30* (2013.01); *G10L 17/22* (2013.01); *H04M 1/6075* (2013.01); *H04R 1/08* (2013.01); *H04R 3/12* (2013.01); *B60H 1/00971* (2013.01); *H04R 2499/13* (2013.01)

(58) Field of Classification Search
CPC .................................................. H04M 1/6075
USPC ....................................................... 455/569.2
See application file for complete search history.

(56) References Cited

U.S. PATENT DOCUMENTS

| | | | |
|---|---|---|---|
| 6,454,178 B1 * | 9/2002 | Fusco | B60H 1/00742 165/203 |
| 7,787,907 B2 * | 8/2010 | Zeinstra | G01C 21/36 455/563 |

(Continued)

*Primary Examiner* — April G Gonzales
(74) *Attorney, Agent, or Firm* — Cynthia R. Parks; Parks IP Law LLC

(57) ABSTRACT

A system, for implementation at a vehicle of transportation, having multiple arrangements of occupant-zone-specific acoustic equipment in the vehicle. Each arrangement is positioned at a respective occupant-specific acoustic zone of the vehicle. Each arrangement is configured to communicate with a hardware-based processing unit that, when executing code of a hardware-based storage device in operation of the system, interacts, via the arrangement, primarily only with a vehicle occupant occupying a corresponding occupant-specific acoustic zone. In some implementations, along with or instead of the acoustic equipment, the system includes multiple arrangements of occupant-zone-specific acoustic equipment in the vehicle. In various embodiments, based on identification of occupants at respective vehicle zones in operation of the vehicle, operations are performed, such as provision of media, vehicle-occupant conversation, and customized HVAC delivery.

19 Claims, 6 Drawing Sheets

(51) Int. Cl.
*H04R 1/08* (2006.01)
*H04R 3/12* (2006.01)

(56) References Cited

U.S. PATENT DOCUMENTS

| | | | |
|---|---|---|---|
| 8,301,108 B2* | 10/2012 | Naboulsi | B60R 11/0264 340/575 |
| 2010/0041397 A1* | 2/2010 | Chutorash | H04W 48/18 455/432.1 |
| 2010/0097239 A1* | 4/2010 | Campbell | B60R 11/0252 340/4.4 |
| 2014/0265268 A1* | 9/2014 | Wang | B60R 21/232 280/729 |
| 2014/0265270 A1* | 9/2014 | Wang | B60R 21/237 280/730.2 |
| 2015/0145234 A1* | 5/2015 | Wang | B60R 21/232 280/729 |
| 2015/0191141 A1* | 7/2015 | Wang | B60R 21/232 280/730.2 |
| 2016/0039383 A1* | 2/2016 | Hicken | B60R 21/232 280/729 |
| 2016/0304045 A1* | 10/2016 | Cuddihy | B60R 21/01512 |
| 2017/0064516 A1* | 3/2017 | Buttolo | H04W 4/046 |

* cited by examiner

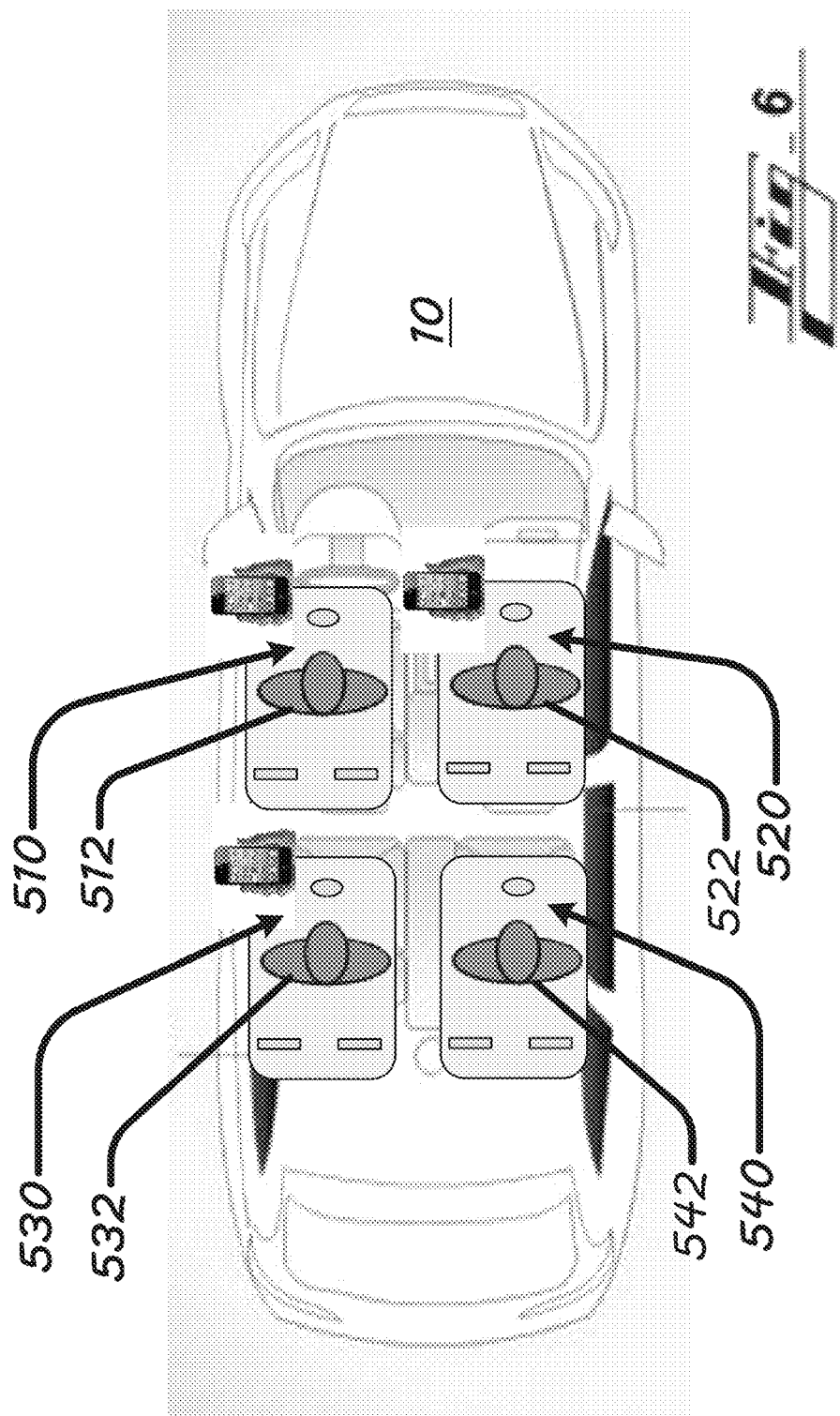

SYSTEM FOR PROVIDING OCCUPANT-SPECIFIC ACOUSTIC FUNCTIONS IN A VEHICLE OF TRANSPORTATION

TECHNICAL FIELD

The present disclosure relates generally to systems for interacting with vehicle occupants, and in various embodiments more particularly to systems for interacting acoustically with each occupant of a vehicle separately.

BACKGROUND

This section provides background information related to the present disclosure which is not necessarily prior art.

Vehicles of transportation are relatively close quarters for co-occupants to share. Spatial boundaries are not a problem, as occupants each have their own seat.

Conventional vehicles do not provide any sound boundaries or barriers, within the vehicle interior, though. When the radio is turned on, the sound is usually delivered to the entire interior, or cabin, and occupants must agree on what is provided, or some must endure what they would prefer not to listen to. When a driver alert is provided from a vehicle system, it is likewise delivered so that it can be readily perceived by all occupants in the cabin.

One approach for limiting effects of all-cabin sound output is to distribute speaker output. Vehicle acoustic settings—balance/fade—can be adjusted toward a side or corner of the vehicle, such as to output the sound mostly to a front/right of the vehicle. However, other occupants can still readily hear the acoustics provided, though they may not want to. Another challenge of this make-shift approach is that only occupants in the front seats can adjust the settings, giving the rear passengers no direct control. Still another shortcoming is that even the targeted listeners—e.g., a rear, right passenger—do not receive quality sound, such as receiving sound mostly through a right ear, versus stereo.

Another approach for limiting effects of all-cabin sound output is for passengers to wear earphones connected to a personal device such as a phone providing music. If all-cabin sound is loud, though, the user will likely still be continuously distracted by the cabin sounds that inevitably make it past the earbuds, even if the background cabin sound is muffled. Also in the earphones case, while the user wants to be insulated from most ambient noise, they would also likely miss audible notifications that they do want to receive. The vehicle may provide, via the conventional vehicle speakers, for instance, a notification for all to hear, such as regarding an adjacent door not being fully closed, or regarding relevant navigation, such as a notification that a route stop particular to the user is being approached, whether delivered by the vehicle, the driver, or another passenger. Earphone users may not hear these announcements, though they would prefer not to miss them.

These challenges are magnified in shared-vehicle scenarios, such as in a taxicab. In some cases, people may not even know each other, or at least are not close family or friends, and they may prefer to listen to different things, and in some cases still hear general cabin notifications.

There is a need for determining from which occupant sound is received to the vehicle. In a bus scenario, or if a parent is driving his kids and their friends in a large van, the driver may have trouble determining straight away who toward the rear said, "I'm feeling sick," or the like.

SUMMARY

The present technology solves these and other challenges related to cabin acoustics. The vehicle is configured to create and maintain respective acoustic zones for vehicle occupants.

The system in various embodiments associates each acoustic zone with a respective vehicle occupant determined to be seated in that zone. In some cases, the system is configured to determine an identity of the person, and utilize a user profile associated with the person in controlling acoustic functions relating to the person.

In most implementations, each zone corresponds to a single occupant seat. In a contemplated embodiment, at least one of the zones corresponds to more than one occupant, such as if a zone is defined as a bench on a van, a bus, or a trolley shared by more than one person.

In contemplated embodiments, more than one zone can be selected in connection with the same function. The system can determine to provide the same audio to both of two distinct third-row zones accommodating young siblings watching a movie together, for example.

The system controls sound output hardware to deliver sound selectively only to one or more pre-determined acoustic zones. The system also associates a user sound received by vehicle microphones with a respective acoustic zone of the communicating user, and processes the communication with consideration afforded to position and/or determined identity of the communicator.

In one aspect, the technology relates to a system, for implementation at a vehicle of transportation. The system includes multiple arrangements of occupant-zone-specific acoustic equipment in the vehicle. Each arrangement is positioned at a respective occupant-specific acoustic zone of the vehicle. And each arrangement is configured to communicate with a hardware-based processing unit that, when executing code of a hardware-based storage device in operation of the system, interacts, via the arrangement, primarily only with a vehicle occupant occupying a corresponding occupant-specific acoustic zone.

In various embodiments, each arrangement of occupant-zone-specific acoustic equipment includes a microphone for sensing sound from the occupant occupying the respective occupant-specific acoustic zone.

In some instances, each arrangement occupant-zone-specific acoustic equipment includes a speaker for providing sound to the respective occupant-specific acoustic zone.

Each arrangement occupant-zone-specific acoustic equipment may include at least two speakers for providing sound to the respective occupant-specific acoustic zone.

In various embodiments, the system includes the hardware-based storage device, wherein: (a) the multiple arrangements of occupant-zone-specific acoustic equipment include: (i) a first arrangement of occupant-zone-specific acoustic equipment positioned at a first occupant-specific acoustic zone of the multiple occupant-specific acoustic zones, (ii) a second arrangement of occupant-zone-specific acoustic equipment positioned at a second occupant-specific acoustic zone of the multiple occupant-specific acoustic zones; (b) the storage device comprises an output-interface module that, by way of the processing unit in operation of the system, determines: (i) first-occupant output audio media—such as audio (music, etc.) or audio and video, navigation information, an incoming phone call (inbound, outbound, via vehicle and/or user mobile device), text message translated to voice, etc.—to deliver by way of a first speaker, of the first arrangement, positioned at the first occupant-specific acoustic zone so that first-speaker output is directed to the first occupant, and generally not perceivable or not readily perceivable, by other occupants, and (ii) second-occupant output audio media, distinct from the first-occupant output audio media, to deliver, simultaneously with provision of the first-occupant output audio media by way of the first speaker of the first arrangement, by way of a second speaker, of the second arrangement, positioned at the second occupant-specific acoustic zone so that second-speaker that output is directed to the second occupant, and generally not perceivable or not readily perceivable, by other occupants.

In some embodiments, the multiple arrangements of occupant-zone-specific acoustic equipment include: (a) a first arrangement of occupant-zone-specific acoustic equipment positioned at a first occupant-specific acoustic zone of the multiple occupant-specific acoustic zones; and (b) a second arrangement of occupant-zone-specific acoustic equipment positioned at a second occupant-specific acoustic zone of the multiple occupant-specific acoustic zones.

The storage device may include an input module that, by way of the processing unit in operation of the system, receives: (i) first-occupant input audio, from a first occupant, by way of a first microphone of the first arrangement being positioned at the first occupant-specific acoustic zone, and (ii) second-occupant input audio, from a second occupant, by way of a second microphone of the second arrangement being positioned at the second occupant-specific acoustic zone.

The hardware-based storage device may include an activity module that, by way of the processing unit in operation of the system (a) determines, based on the first-occupant input audio, first media to provide to a first speaker, of the first arrangement, positioned at the first occupant-specific acoustic zone, and (b) determines, based on the second-occupant input audio, second media to provide to a second speaker, of the second arrangement, positioned at the second occupant-specific acoustic zone.

The system in various embodiments also includes a first-occupant heating, ventilation, and air conditioning (HVAC) output equipment positioned at the first occupant-specific acoustic zone; and a second-occupant HVAC output equipment positioned at the second occupant-specific acoustic zone. The hardware-based storage device includes an activity module that, by way of the processing unit in operation of the system: (i) determines, based on the first-occupant input audio, a first setting controlling HVAC output at the first-occupant HVAC output equipment; and (ii) determines, based on the second-occupant input audio, a second setting controlling HVAC output at the second-occupant HVAC output equipment.

In some implementations, the hardware-based storage device includes an activity module that, by way of the processing unit in operation of the system: (a) determines, based on first occupant identity-indicating input, a first identity, of a first vehicle occupant, occupying the first occupant-specific acoustic zone of the multiple occupant-specific acoustic zones; and (b) determines, based on second occupant identity-indicating input, a second identity, of a second vehicle occupant, occupying the second occupant-specific acoustic zone of the multiple occupant-specific acoustic zones.

The hardware-based storage device in various embodiments includes a database module that, by way of the processing unit in operation of the system: (i) obtains, using the first identity, a first occupant setting; (ii) obtains, using the second identity, a second occupant setting, and the activity module that, by way of the processing unit in operation of the system: (a) determines, based on the first identity, a first control setting or mode for use in controlling first-occupant heating, ventilation, and air conditioning (HVAC) output equipment positioned at the first occupant-specific acoustic zone; and (b) determines, based on the second identity, a second control setting or mode for use in controlling second-occupant HVAC output equipment positioned at the second occupant-specific acoustic zone.

In various embodiments, the hardware-based storage device comprises a database module that, by way of the processing unit in operation of the system (a) access, using the first identity, a first occupant setting; and (b) access, using the second identity, a second occupant setting; and the activity module is configured to, by way of the processing unit in operation of the system: (i) determine, based on the first identity, a first control setting or mode for use in controlling a first arrangement of occupant-zone-specific acoustic equipment, of the multiple arrangements of occupant-zone-specific acoustic equipment, being positioned at the first occupant-specific acoustic zone; and (ii) determine, based on the second identity, a second control setting or mode for use in controlling a second arrangement of occupant-zone-specific acoustic equipment, of the multiple arrangements of occupant-zone-specific acoustic equipment, being positioned at the first occupant-specific acoustic zone.

In various embodiments, (a) the first control setting or mode affects which first media is provided by way of the first arrangement, or a manner by which the first media is provided, for consumption by a first occupant occupying the first occupant-specific acoustic zone; and (b) the second control setting or mode affects which second media is provided by way of the second arrangement, or a manner by which the second media is provided, for consumption by a second occupant occupying the second occupant-specific acoustic zone.

In various embodiments, (i) the first control setting or mode affects a manner by which the system interacts with a first occupant occupying the first occupant-specific acoustic zone; and (ii) the second control setting or mode affects a manner by which the system interacts with a second occupant occupying the second occupant-specific acoustic zone.

The first and second occupant identity-indicating input may be received from at least one vehicle sensor configured and arranged in the vehicle to sense occupant characteristics indicative of occupant identify.

In another aspect, the system may include, instead of or along with the zone-specific acoustic equipment, multiple arrangements of occupant-zone-specific heating, ventilation, and air-conditioning output (HVAC-output) equipment in the vehicle. Each of these arrangements is positioned at a respective occupant-specific HVAC zone of the vehicle, and each arrangement is configured to communicate with a hardware-based processing unit that, when executing code of a hardware-based storage device, interacts, via the arrangement, primarily only with a vehicle occupant occupying a corresponding occupant-specific acoustic zone.

The hardware-based storage device in such cases may include an activity module that, by way of the processing unit in operation of the system: (a) determines, based on a determined first identity, of a first vehicle occupant, occupying the first occupant-specific HVAC zone, a first manner by which to provide HVAC at the first occupant-specific HVAC zone, and (b) determines, based on a determined second identity, of a second vehicle occupant, occupying the second occupant-specific HVAC zone, a second manner by which to provide HVAC at the second occupant-specific HVAC zone.

In some implementations, the multiple arrangements of occupant-zone-specific HVAC equipment include: (a) a first arrangement of occupant-zone-specific HVAC equipment positioned at a first occupant-specific HVAC zone of the multiple occupant-specific HVAC zones; and (b) a second arrangement of occupant-zone-specific HVAC equipment positioned at a second occupant-specific HVAC zone of the multiple occupant-specific HVAC zones; and the storage device comprises an input module that, by way of the processing unit in operation of the system, receives: (i) first-occupant input audio, from a first occupant, by way of a first microphone at the first occupant-specific HVAC zone; and (ii) second-occupant input audio, from a second occupant, by way of a second microphone at the second occupant-specific HVAC zone.

In some implementations, the hardware-based storage device comprises an activity module that, by way of the processing unit in operation of the system: (a) determines, based on the first-occupant input audio, a first manner by which to provide HVAC at the first occupant-specific HVAC zone; and (b) determines, based on the second-occupant input audio, a second manner by which to provide HVAC at the second occupant-specific HVAC zone.

In another aspect, the system includes multiple arrangements of occupant-zone-specific acoustic equipment, each arrangement being positioned, for operation of the system, at a respective occupant-specific acoustic zone of the vehicle; a processing unit; and a hardware-based storage device (HBSD). The HBSD includes a database module that, by way of the processing unit in operation of the system: (a) obtains a first occupant setting using a determined first identity of a first occupant at a first occupant-specific acoustic zone of the vehicle; and (b) obtains a second occupant setting using a determined second identity of a second occupant occupying a second occupant-specific acoustic zone of the vehicle. The HBSD also includes an activity module that, by way of the processing unit in operation of the system: (i) determines, based on the first identify, a manner by which to interact with the first occupant while the first occupant is positioned in the first occupant-specific acoustic zone; and (ii) determines, based on the second identify, a manner by which to interact with the second occupant while the second occupant is positioned in the second occupant-specific acoustic zone.

The first manner may include at least one manner selected from a group of manners consisting of: (a) a type of media to provide to the first occupant by way of a first arrangement of occupant-zone-specific acoustic equipment; (b) a type of heating, ventilation, and air-conditioning (HVAC) to provide to the first occupant; (c) a statement to make to the first occupant by way of the first arrangement of occupant-zone-specific acoustic equipment; (d) a question to ask of the first occupant by way of the first arrangement of occupant-zone-specific acoustic equipment; (e) a message to provide to the first occupant by way of the first arrangement of occupant-zone-specific acoustic equipment; (f) a notification to provide to the first occupant by way of the first arrangement of occupant-zone-specific acoustic equipment; and (g) determining that first voice input received by the first arrangement of occupant-zone-specific acoustic equipment was received from the first occupant, and acting on the first voice input, accordingly. The same can apply regarding the second occupant—e.g., the second manner can include at least one manner selected from a group of manners consisting of a type of media to provide to the second occupant by way of a second arrangement of occupant-zone-specific acoustic equipment, a type of heating, ventilation, and air-conditioning (HVAC) to provide to the second occupant, etc.

Other aspects of the present technology will be in part apparent and in part pointed out hereinafter.

DESCRIPTION OF THE DRAWINGS

FIG. 6 shows the acoustic zones of FIG. 5 occupied by passengers.

The figures are not necessarily to scale and some features may be exaggerated or minimized, such as to show details of particular components.

DETAILED DESCRIPTION

As required, detailed embodiments of the present disclosure are disclosed herein. The disclosed embodiments are merely examples that may be embodied in various and alternative forms, and combinations thereof. As used herein, for example, exemplary, and similar terms, refer expansively to embodiments that serve as an illustration, specimen, model or pattern.

In some instances, well-known components, systems, materials or processes have not been described in detail in order to avoid obscuring the present disclosure. Specific structural and functional details disclosed herein are therefore not to be interpreted as limiting, but merely as a basis for the claims and as a representative basis for teaching one skilled in the art to employ the present disclosure.

I. TECHNOLOGY INTRODUCTION

The present disclosure describes, by various embodiments, vehicle systems configured to create and maintain effective respective acoustic zones for vehicle occupants.

In contemplated embodiments, the zones can be used for more than only acoustic-related functions. The zones can be used for delivering audio and/or visual media, such as an audio and/or visual alert or a video, to only one or more subject zones, such as via a screen mounted in or in front of only a subject zone, and not screens in front of other zones.

Zones may be referred to by other names, then, such as media zones, dedicated media zones, vehicle interaction zones, etc.

While select examples of the present technology describe transportation vehicles or modes of travel, and particularly automobiles, the technology is not limited by the focus. The concepts can be extended to a wide variety of vehicle transporting more than one parson at a time, including aircraft, watercraft, buses, trolleys or streetcars, and the like.

II. HOST VEHICLE—FIG. 1

Figure 1:
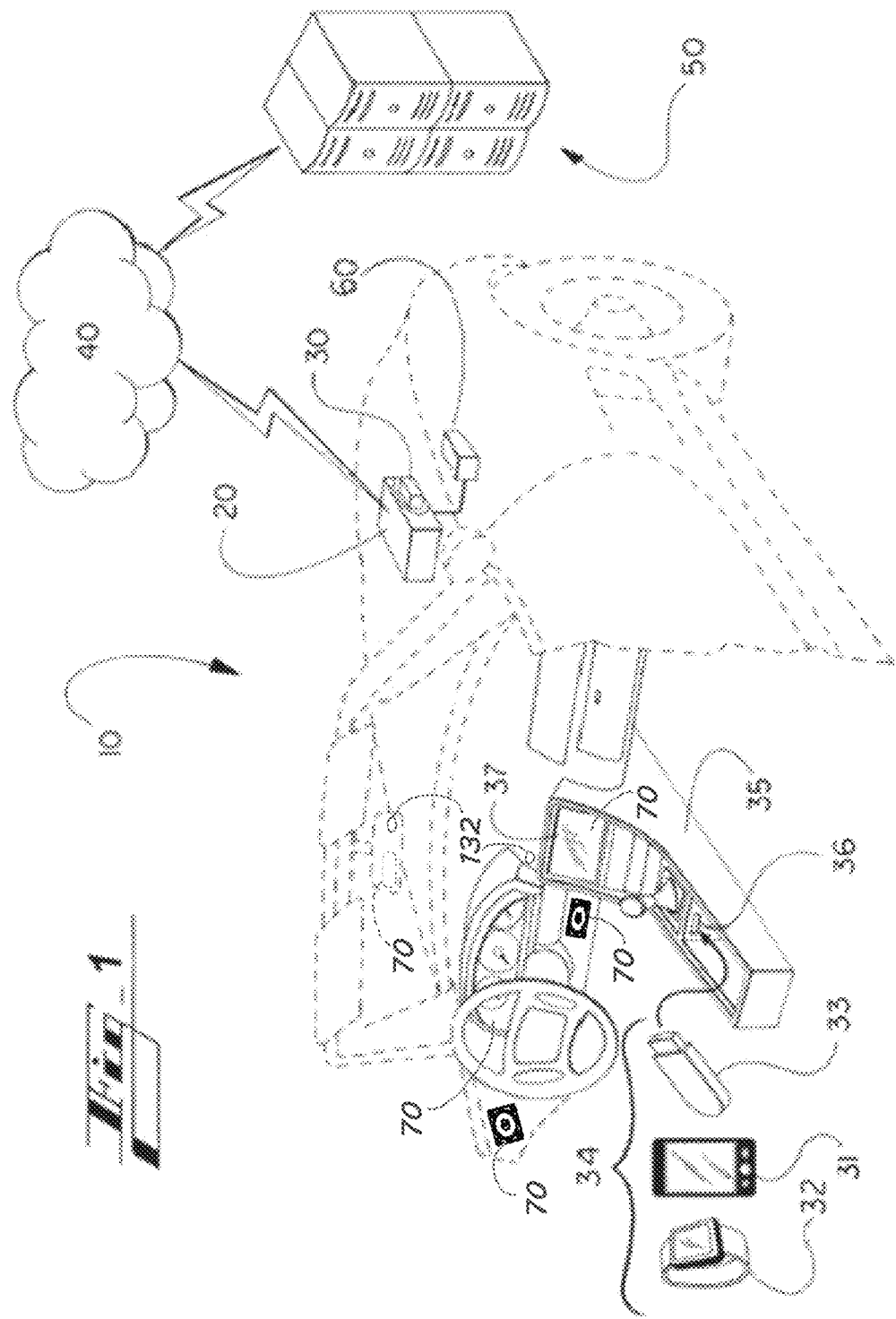
FIG. 1 illustrates schematically an example vehicle of transportation, with local and remote personal computing devices, according to embodiments of the present technology.

Turning now to the figures and more particularly the first figure, FIG. 1 shows an example host structure or apparatus 10, such as an automobile in the form of a vehicle.

The vehicle 10 includes a hardware-based controller or controlling system 20. The hardware-based controlling system 20 includes a communication sub-system 30 for communicating with local computing devices 34 and/or external networks 40.

By the external networks 40, such as the Internet, a local-area, cellular, or satellite network, vehicle-to-vehicle, pedestrian-to-vehicle or other infrastructure communications, etc., the vehicle 10 can reach mobile or local systems 34 or remote systems 50, such as remote servers.

Example local devices 34 include a user smartphone 31, a user wearable device 32, and a USB mass storage device 33, and are not limited to these examples. Example wearables 32 include smart-watches, eyewear, and smartjewelry, such as earrings, necklaces, lanyards, etc.

Another example local device is an on-board device (OBD), such as a wheel sensor, a brake sensor, an accelerometer, a rotor-wear sensor, throttle-position sensor, steering-angle sensor, revolutions-per-minute (RPM) sensor or indicator, brake-force sensors, other vehicle state or dynamics-related sensor for the vehicle, with which the vehicle is retrofitted with after manufacture. The OBD(s) can include or be a part of a sensor sub-system referenced below by numeral 60. The sensor sub-system 60 includes sensors 132, such as microphones and cameras configured to sense presence of people, activities or people, or other cabin activity or characteristics. This particularly subset of sensors 132 are described more below.

The vehicle controlling system 20, which in contemplated embodiments includes one or more microcontrollers, can communicate with OBDs via a controller area network (CAN). The CAN message-based protocol is typically designed for multiplex electrical wiring with automobiles, and CAN infrastructure may include a CAN bus. The OBD can also be referred to as vehicle CAN interface (VCI) components or products, and the signals transferred by the CAN may be referred to as CAN signals. Communications between the OBD(s) and the primary controller or microcontroller 20 are in other embodiments executed via similar or other message-based protocol.

The vehicle 10 also has a mounting structure 35. The mounting structure 35 includes a central console, a dashboard, and an instrument panel. The mounting structure 35 includes a plug-in port 36—a USB port, for instance—and a visual display 37, such as a touch-sensitive, input/output, human-machine interface (HMI).

The vehicle 10 also has a sensor sub-system 60 including sensors providing information to the controlling system 20. Sensor data relates to features such as vehicle operations, vehicle position, vehicle pose, user characteristics, such as biometrics or physiological measures, and environments within and outside of the vehicle 10. The OBDs mentioned can be considered as local devices, sensors of the sub-system 60, or both in various embodiments. Local devices 34 (e.g., user phone, user wearable, or user plug-in device) can be considered as sensors 132 as well, such as in embodiments in which the vehicle 10 uses data provided by the local device based on output of a local-device sensor(s). The vehicle system can use data from a user smartphone, for instance, indicating user-physiological data sensed by a biometric sensor of the phone.

The vehicle 10 also includes cabin output components 70, such as sound speakers, an instruments panel. The output components may also include a dashboard or center-stack display screen, a rear-view-mirror screen (for displaying imaging from a vehicle aft/backup camera), and any vehicle visual display device (e.g., visual display 37).

III. ON-BOARD COMPUTING ARCHITECTURE—FIG. 2

Figure 2:
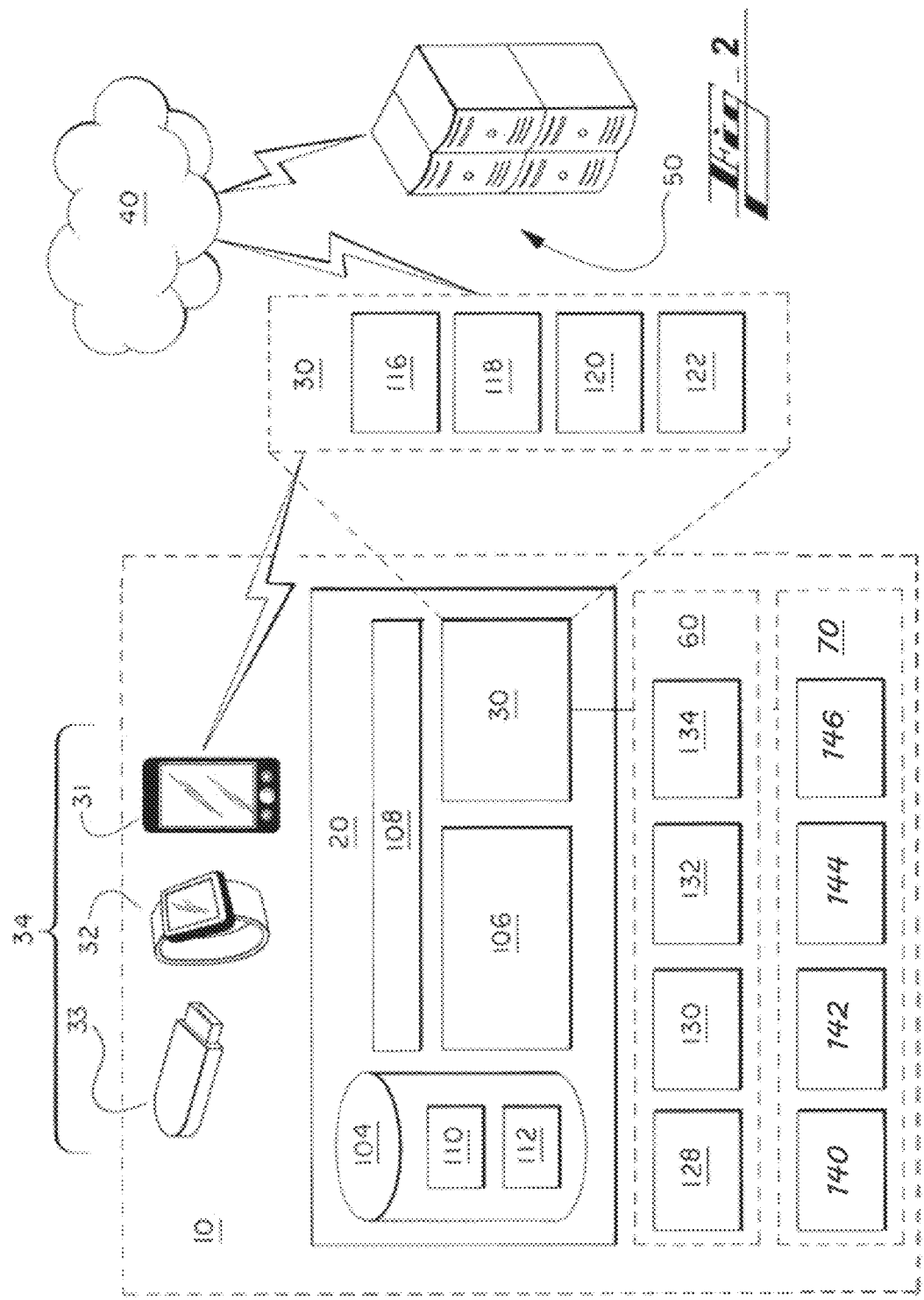
FIG. 2 illustrates schematically more details of the example vehicle computer of FIG. 1 in communication with the local and remote computing devices.

FIG. 2 illustrates in more detail the hardware-based computing or controlling system 20 of FIG. 1. The controlling system 20 can be referred to by other terms, such as computing apparatus, controller, controller apparatus, or such descriptive term, and can be or include one or more microcontrollers, as referenced above.

The controller system 20 is in various embodiments part of the mentioned greater system 10, such as a vehicle.

The controlling system 20 includes a hardware-based computer-readable storage medium, or data storage device 104 and a hardware-based processing unit 106. The processing unit 106 is connected or connectable to the computer-readable storage device 104 by way of a communication link 108, such as a computer bus or wireless components.

The processing unit 106 can be referenced by other names, such as processor, processing hardware unit, the like, or other.

The processing unit 106 can include or be multiple processors, which could include distributed processors or parallel processors in a single machine or multiple machines. The processing unit 106 can be used in supporting a virtual processing environment.

The processing unit 106 could include a state machine, application specific integrated circuit (ASIC), or a programmable gate array (PGA) including a Field PGA, for instance. References herein to the processing unit executing code or instructions to perform operations, acts, tasks, functions, steps, or the like, could include the processing unit performing the operations directly and/or facilitating, directing, or cooperating with another device or component to perform the operations.

In various embodiments, the data storage device 104 is any of a volatile medium, a non-volatile medium, a removable medium, and a non-removable medium.

The term computer-readable media and variants thereof, as used in the specification and claims, refer to tangible storage media. The media can be a device, and can be non-transitory.

In some embodiments, the storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The data storage device 104 includes one or more storage modules 110 storing computer-readable code or instructions executable by the processing unit 106 to perform the functions of the controlling system 20 described herein. The modules and functions are described further below in connection with FIGS. 3-6.

The data storage device 104 in some embodiments also includes ancillary or supporting components 112, such as additional software and/or data supporting performance of the processes of the present disclosure, such as one or more user profiles or a group of default and/or user-set preferences.

As provided, the controlling system 20 also includes a communication sub-system 30 for communicating with local and external devices and networks 34, 40, 50. The communication sub-system 30 in various embodiments includes any of a wire-based input/output (i/o) 116, at least one long-range wireless transceiver 118, and one or more short- and/or medium-range wireless transceivers 120. Component 122 is shown by way of example to emphasize that the system can be configured to accommodate one or more other types of wired or wireless communications.

The long-range transceiver 118 is in some embodiments configured to facilitate communications between the controlling system 20 and a satellite and/or a cellular telecommunications network, which can be considered also indicated schematically by reference numeral 40.

The short- or medium-range transceiver 120 is configured to facilitate short- or medium-range communications, such as communications with other vehicles, in vehicle-to-vehicle (V2V) communications, and communications with transportation system infrastructure (V2I). Broadly, vehicle-to-entity (V2X) can refer to short-range communications with any type of external entity (for example, devices associated with pedestrians or cyclists, etc.).

To communicate V2V, V2I, or with other extra-vehicle devices, such as local communication routers, etc., the short- or medium-range communication transceiver 120 may be configured to communicate by way of one or more short- or medium-range communication protocols. Example protocols include Dedicated Short-Range Communications (DSRC), WI-FI®, BLUETOOTH®, infrared, infrared data association (IRDA), near field communications (NFC), the like, or improvements thereof (WI-FI is a registered trademark of WI-FI Alliance, of Austin, Tex.; BLUETOOTH is a registered trademark of Bluetooth SIG, Inc., of Bellevue, Wash.).

By short-, medium-, and/or long-range wireless communications, the controlling system 20 can, by operation of the processor 106, send and receive information, such as in the form of messages or packetized data, to and from the communication network(s) 40.

External devices 50 with which the sub-system 30 communicates are in various embodiments nearby the vehicle 10, remote to the vehicle, or both. Any such devices 50 in implementations can be considered to be 'in the cloud.'

The remote devices 50 can be configured with any suitable structure for performing the operations described herein. Example structure includes any or all structures like those described in connection with the vehicle computing device 20. Remote devices 50 include, for instance, a processing unit, a storage medium comprising modules, a communication bus, and an input/output communication structure. These features are considered shown for the remote device 50 by FIG. 1 and the cross-reference provided by this paragraph.

While local devices 34 are shown within the vehicle 10 in FIGS. 1 and 2, any of them may be external to the vehicle and in communication with the vehicle.

Example remote systems 50 include a remote server (for example, application server), or a remote data, customer-service, and/or control center. A user computing or electronic device 34, such as a smartphone, can also be remote to the vehicle 10, and in communication with the sub-system 30, such as by way of the Internet or other communication network 40.

An example control center is the OnStar® control center, having facilities for interacting with vehicles and users, whether by way of the vehicle or otherwise (for example, mobile phone) by way of long-range communications, such as satellite or cellular communications. ONSTAR is a registered trademark of the OnStar Corporation, which is a subsidiary of the General Motors Company.

As mentioned, the vehicle 10 also includes a sensor sub-system 60 comprising sensors providing information to the controlling system 20 regarding items such as vehicle operations, vehicle position, vehicle pose, user characteristics, such as biometrics or physiological measures, and/or the environment about the vehicle 10. The arrangement can be configured so that the controlling system 20 communicates with, or at least receives signals from sensors of the sensor sub-system 60, via wired or short-range wireless communication links 116, 120.

In various embodiments, the sensor sub-system 60 includes at least one camera 128 and at least one range sensor 130, such as radar or sonar. The camera 128 may include a monocular forward-looking camera, such as those used in lane-departure-warning (LDW) systems. Other embodiments may include other camera technologies, such as a stereo camera or a trifocal camera.

Sensors configured to sense external conditions may be arranged or oriented in any of a variety of directions without departing from the scope of the present disclosure. For example, the cameras 128 and the range sensor 130 may be oriented at each, or a select, position of, (i) facing forward from a front center point of the vehicle 10, (ii) facing rearward from a rear center point of the vehicle 10, (iii) facing laterally of the vehicle from a side position of the vehicle 10, and/or (iv) between these directions, and each at or toward any elevation, for example.

The range sensor 130 may include a short-range radar (SRR), an ultrasonic sensor, a long-range radar, such as those used in autonomous or adaptive-cruise-control (ACC) systems, sonar, or a Light Detection And Ranging (LiDAR) sensor, for example.

Other example sensor sub-systems 60 include cabin sensors 132 configured and arranged (e.g., positioned and fitted in the vehicle) to sense activity, people, cabin environmental conditions, or other features relating to the interior of the vehicle. Example cabin sensors 132 include microphones, in-vehicle cameras, seat-weight sensors, user salinity, retina or other user characteristics, biometrics, or physiological measures, and/or the environment about the vehicle 10.

Other example sensor sub-systems 60 include dynamic vehicle sensors 134, such as an inertial-momentum unit (IMU), having one or more accelerometers, for instance, and/or other dynamic vehicle sensors 134, such as a wheel sensor or a sensor associated with a steering system (for example, steering wheel) of the vehicle 10.

The sensor sub-system 60 can include any sensor for measuring a vehicle pose or other dynamics, such as position, speed, acceleration, or height—e.g., vehicle height sensor.

The sensor sub-system 60 can include any known sensor for measuring an environment of the vehicle, including those mentioned above, and others such as a precipitation sensor for detecting whether and how much it is raining or snowing, a temperature sensor, and any other.

Sensors for sensing user characteristics include any biometric sensor, such as a retina or other eye scanner or sensor, camera, microphone associated with a voice recognition sub-system, a weight sensor, salinity sensor, breath-quality sensors (e.g., breathalyzer), a user-temperature sensor, electrocardiogram (ECG) sensor, Electrodermal Activity (EDA) or Galvanic Skin Response (GSR) sensors, Blood Volume Pulse (BVP) sensors, Heart Rate (HR) sensors, electroencephalogram (EEG) sensor, Electromyography (EMG), and user-temperature, a sensor measuring salinity level, the like, or other.

User-vehicle interfaces, such as a touch-sensitive display (e.g., visual display 37), buttons, knobs, the like, or other can also be considered part of the sensor sub-system 60.

FIG. 2 also shows the cabin output components 70 mentioned above. The output components in various embodiments include a mechanism for communicating with vehicle occupants. The components include but are not limited to sound speakers 140, visual displays 142, such as the instruments panel, center-stack display screen, and rear-view-mirror screen, and haptic outputs 144, such as steering wheel or seat vibration actuators. The fourth element 146 in this section 70 is provided to emphasize that the vehicle can include any of a wide variety of other in output components, such as components providing an aroma or light into the cabin.

IV. ADDITIONAL VEHICLE COMPUTING STRUCTURES—FIG. 3

Figure 3:
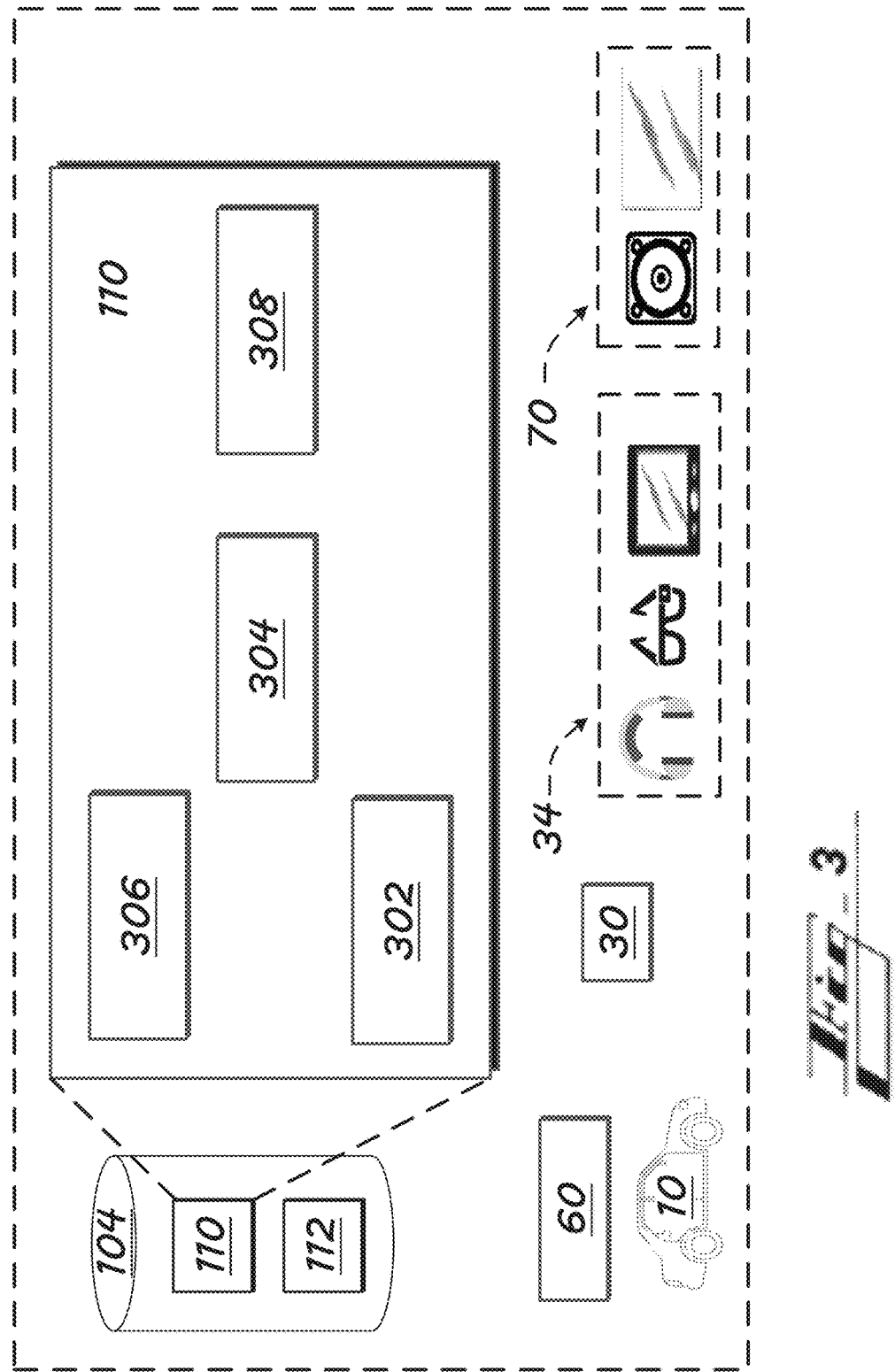
FIG. 3 shows another view of the vehicle, emphasizing example memory components.

FIG. 3 shows an alternative view of the vehicle 10 of FIGS. 1 and 2 emphasizing example memory components and associated devices.

As mentioned, the data storage device 104 includes one or more storage modules 110 for performance of the processes of the present disclosure. The device 104 may include ancillary components 112, such as additional software and/or data supporting performance of the processes of the present disclosure. The ancillary components 112 can include, for example, additional software and/or data supporting performance of the processes of the present disclosure, such as one or more user profiles or a group of default and/or user-set preferences.

Any of the code or instructions described can be part of more than one module. And any functions described herein can be performed by execution of instructions in one or more modules, though the functions may be described primarily in connection with one module by way of primary example. Each of the modules can be referred to by any of a variety of names, such as by a term or phrase indicative of its function.

Sub-modules can cause the processing hardware-based unit 106 to perform specific operations or routines of module functions. Each sub-module can also be referred to by any of a variety of names, such as by a term or phrase indicative of its function.

Example modules 110 shown include:
an input module 302;
an activity module 306;
a database module 306; and
an output-interface module 308.

Any of the code or instructions described can be part of more than one module. And any functions described herein can be performed by execution of instructions in one or more modules, though the functions may be described primarily in connection with one module by way of primary example. Each of the modules can be referred to by any of a variety of names, such as by a term or phrase indicative of its function.

The modules, sub-modules, and their functions are described more below.

V. ALGORITHMS AND PROCESSES

V.A. Introduction to the Algorithms—FIG. 4

Figure 4:
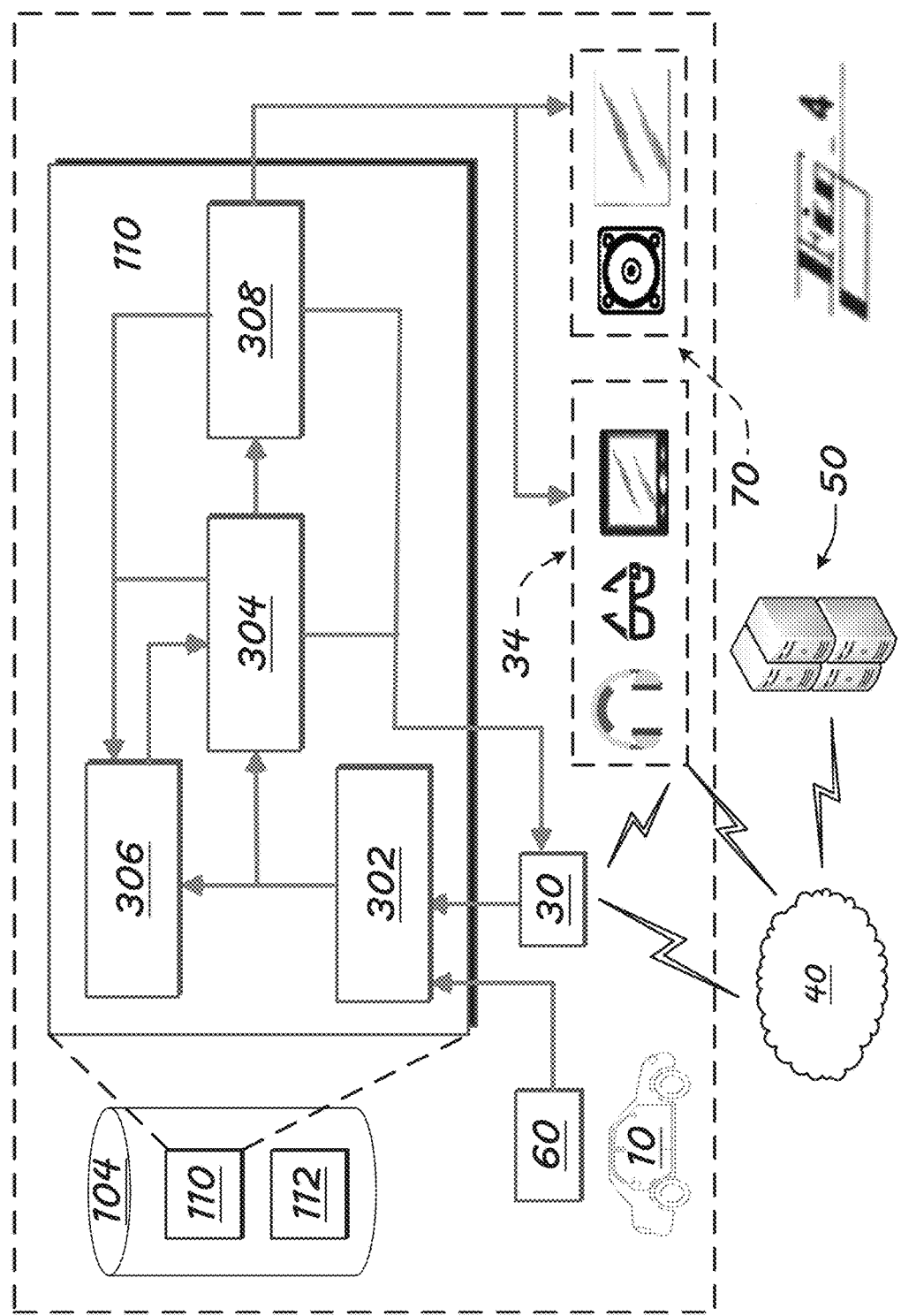
FIG. 4 shows interactions between the various components of FIG. 3, including with external systems.

FIG. 4 shows an example algorithm, represented schematically by a process flow, according to embodiments of the present technology. Though a single process flow is shown for simplicity, any of the functions or operations can be performed in one or more or processes, routines, or sub-routines of one or more algorithms, by one or more devices or systems.

It should be understood that the steps, operations, or functions of the processes 400 are not necessarily presented in any particular order and that performance of some or all the operations in an alternative order is possible and is contemplated. The processes can also be combined or overlap, such as one or more operations of one of the processes being performed in the other process.

The operations have been presented in the demonstrated order for ease of description and illustration. Operations can be added, omitted and/or performed simultaneously without departing from the scope of the appended claims. It should also be understood that the illustrated processes 400 can be ended at any time.

In certain embodiments, some or all operations of the processes 400 and/or substantially equivalent operations are performed by a computer processor, such as the hardware-based processing unit 106, executing computer-executable instructions stored on a non-transitory computer-readable storage device, such as any of the data storage devices 104, or of a mobile device, for instance, described above.

V.B. System Components and Functions—FIGS. 3-6

FIG. 3 shows example vehicle outputs 70, and user devices 34, which may be positioned in the vehicle 10 as shown. The outputs 70 include acoustic-zone specific outputs, such as speakers dedicated to a single occupant seat, such as by being positioned in the seat—e.g., head-rest or upper-portion of the seat—or in an adjacent pillar (e.g., left B-pillar for driver-seat occupant, or right C-pillar for right/second-row occupant).

FIG. 4 shows the components of FIG. 3, including system modules, interacting according to various exemplary algorithms and process flows. Other vehicle components shown include the vehicle communications sub-system 30, the vehicle sensor sub-system 60.

Figure 5:
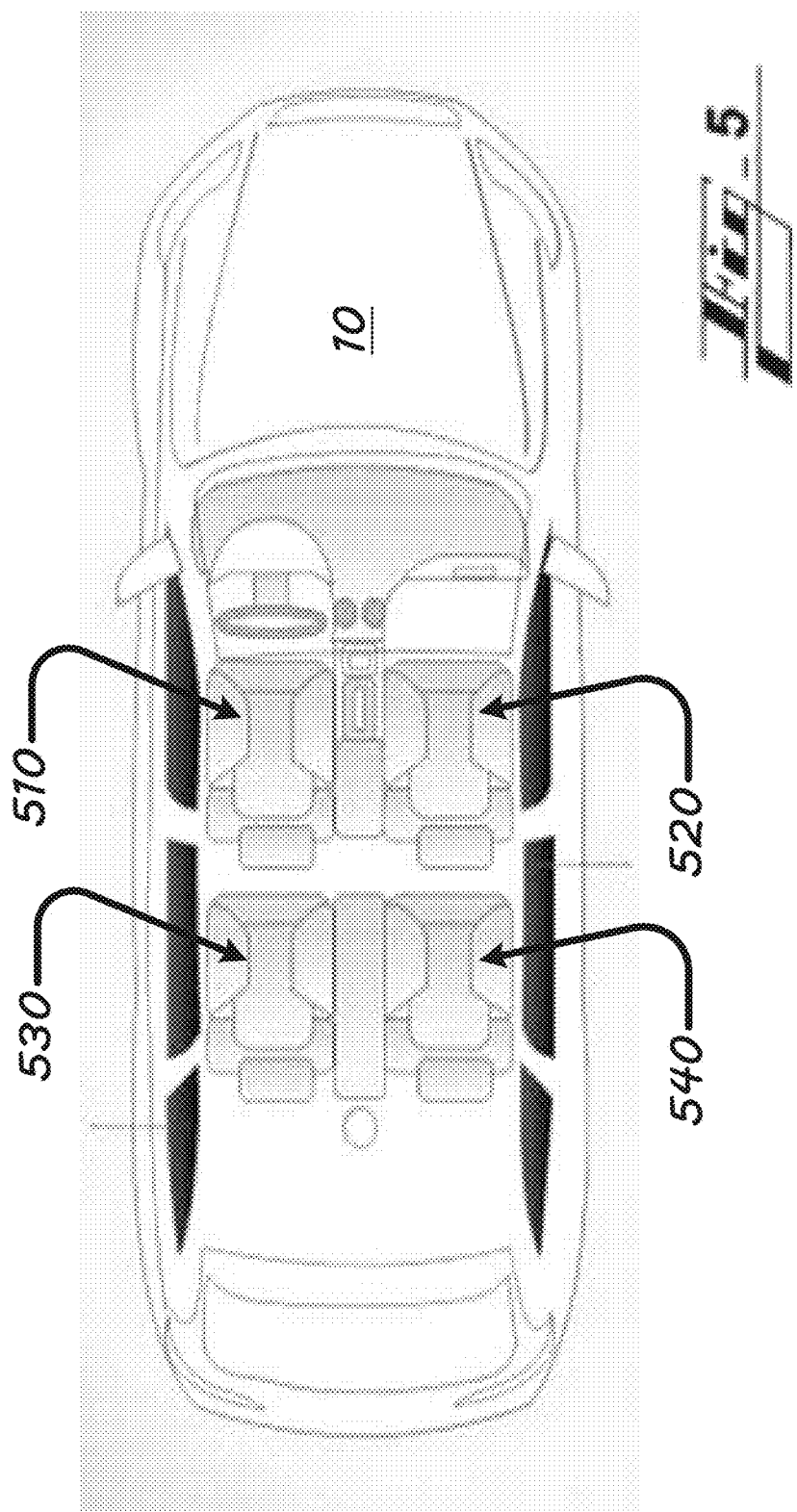
FIG. 5 shows example acoustic zones of the vehicle.

FIG. 5 illustrates a schematic view of the vehicle 10 showing an exemplary acoustic-zone layout. The layout includes four zones corresponding to the four seats of the vehicle:
a first zone 510 (driver seat, though occupant is a passenger during autonomous driving);
a second zone 520 (front-seat passenger);
a third zone 530 (left-rear passenger); and
a fourth 540 (right-rear passenger).

With further reference to FIG. 3 and the vehicle modules 110, the input module 302, executed by a processor such as the hardware-based processing unit 106, receives any of a wide variety of inputs to the system. Inputs include data from vehicle sensors 60, for instance, vehicle cameras, touch-sensitive screens, buttons, knobs, microphones, thermal sensors, in-seat weight sensors, motion-detection sensors, or others.

Inputs to the input module 302 in some implementations include data received via the vehicle communication sub-system 30 from sources separate from the vehicle 10.

Sources include remote systems, such as a remote server 50, such as a server of a taxi company operating a fleet of which the vehicle 10 belongs, of an operator of a ride-sharing service, or of a customer-service system, such as systems of the OnStar® control center mentioned, or a sharing-information system. The remote system 50 shown can also represent any remote computer, such as a home computer of an owner or operator of the vehicle 10.

Sources providing data via the communication sub-system 30 can further include mobile devices 34, whether local or remote.

The inputs are passed, after any formatting, conversion, or other processing at the input module 302, to the activity module 304.

The activity module 304 in various implementations also requests (pull), receives without request (push), or otherwise obtains relevant data from the database module 306. The database module 306 may include or be part of or in communication with storage portions of the vehicle 10, such as a portion storing the ancillary data mentioned. The ancillary data may, as mentioned, include one or more user profiles. The profiles can be pre-generated by the system processor, or received from a remote source such as the server 50 or a remote user computer, as examples.

The profile for each user can include user-specific preferences communicated to the system by the user, such as via a touch-screen or microphone interface.

Preferences include any settings affecting a manner by which the system interacts with the user or interacts (shares data) with a non-vehicle system such as a server or user device. Example preferences include volume, tone, or other sound preferences for media delivery—such as audio (music, etc.) or audio and video, navigation information, etc.—type or volume of notifications provided to the user, as just a few examples.

Data from the database module 306 can also include historic data representing past activity between the system and a user, between the system and other users, or other systems and these or other users, for instance. If on repeated occasions, in response to receiving a certain notification, a user turns down a volume in their acoustic zone, the system can generate historic data for that user requiring the system to use a lower-volume for the notification.

Preferences can also be received from an external profile, such a profile stored at a user mobile device 34 or a remote server 50, and local and remote profile features can be synchronized or shared between the vehicle 10 and the external profile.

Based on the various inputs, the activity module 306 performs various operations described expressly and inherently herein.

Activity-module operations can include determining presence, identity and eventual intra-vehicle zone location of one or more users approaching the vehicle 10, entering the vehicle, or in the vehicle.

FIG. 6 shows a view of the vehicle 10 having occupants 512, 522, 532, 542 present in the respective zones 510, 520, 530, 540.

Sensor data (60) includes data supporting the determination of user occupancy. For instance, seat-based weight sensors can indicate occupant presence for instance, as can radar, sonar, or other motion-detection sensors. Presence can be determined in other ways, such as by one or more microphones, thermal sensors (positioned in seat, for instance), or any available sensor that can indicate user presence.

In one embodiment, presence and/or user intra-vehicle location are determined based on sensing presence of a user-worn or -carried device, such as a user mobile device 34—which may user Bluetooth communications for the purpose—or a radio-frequency identification (RFID) tag. Such devices can also be used in identifying the occupants.

In various embodiments, activity module 304 performs functions in response to determining user occupancy. As an example, occupancy determination may trigger an identification routine whereby the module 304 seeks to identify the one or more occupants determined present. As another example, an occupancy determination indicating which seat a user is sitting in may trigger the system activating, in the system, the acoustic zone corresponding to that seat, or changing a mode for the zone to active. As still another example, an occupancy determination indicating which seat a user is sitting in can trigger the system greeting the user, such as by a gentle tone or voice provided via seat-dedicated speakers in the head-rest or upper-portion of the seat the occupant is sitting.

As mentioned, activity-module operations can include identifying one or more occupants approaching the vehicle 10, entering the vehicle, or in the vehicle. Identification can be performed using any of a wide variety of techniques. Apparatus used for identifying occupants can be referred to generally as occupant-identifying devices.

In various embodiments, identification, such as by automated speech recognition (ASR), is initiated in response to a user entering the vehicle.

Examples include identifying an occupant based on a user device that they are wearing or have in their position, such as a mobile phone, wearable device (smart glasses, etc.), other portable occupant communication device, or an RFID tag. Identifying or recognizing a user can be referred to as 'registration.' As shown in FIG. 6, three of the occupants 512, 522 and 532 have user devices.

In various embodiments, a user can pre-register for a vehicle use, such as a taxi or shared ride. The system is configured to identify the user in various embodiments for any of various benefits, such as for safety reasons (ensuring only the proper people are using the vehicle) and to customize the user experience (media, HVAC, vehicle-user interactions, etc.). These aspects are referenced elsewhere herein, such as regarding identification and registration of users upon arrival to the vehicle, routing and notifying user of upcoming stops, providing user-specific media, HVAC, and vehicle-user interactions according to pre-established user profiles, preferences, and settings, whether stored at the vehicle, user phone, at a remote server or otherwise.

The system is in various embodiments configured to allow a user to pre-arrange a vehicle use, such a booking a taxi or shared ride. The booking may include an itinerary indicating the user's route, waypoints, or at least origin and destination.

In various embodiments, the user makes such booking by way of an application (app) customized for the purpose. The app may be on a user phone, tablet, laptop, or PC for instance. The app is configured to interact with a remote server, or computing system, and/or the vehicle, which may have the same or corresponding app. User profiles, preferences, and settings, including or as well as any suitable other information, such as user routes, calendar, and schedule may also be stored in or accessible by the app(s).

For a vehicle use, if the user-specific information—e.g., user ID, profile, preferences, itinerary, etc.—is not already stored at the vehicle, such as if it is a family or work fleet vehicle, the information may be sent to the vehicle from the remote server or user mobile device app.

In one embodiment, if the system does not recognize the occupant, the system can use default settings for interacting with that occupant.

Other example basis by which the activity module 304 can identify occupants includes biometric characteristics, such as voice, retina, facial, or other type of physical recognition. In some embodiments, the user indicates their identity, such as by saying their name.

Activity-module operations include performing zone-specific communications or interactions with respective occupants. Output of the activity module 340 is in various embodiments provided to any of database module 306, the output-interface module 308, and the vehicle communication sub-system 30 for reaching non-vehicle devices.

The output-interface module 308 formats, converts, or otherwise processes output of the activity module 304 prior to delivering same to the various output components.

System output components include vehicle speakers, screens, or other vehicle outputs 70. Example system output components can also include user mobile devices, such as smartphones, wearables, and headphones. Various output can be provided via user mobile devices, such as media—such as audio (music, etc.) or audio and video, navigation information, etc.—telephone calls (incoming or outgoing), or other.

In various embodiments, output (audio playback, other media or occupant-vehicle interaction, phone calls, etc.) can be provided selectively to just one specific occupant/occupant zone (private communication) or to be sensed by more than one occupant, such as when an announcement or alert should be heard by all users (public communication).

Example system output components can also include remote systems 50 such as remote servers and user computer systems (e.g., home computer). The output can be received and processed at these systems, such as to update a user profile with a determined preference, activity taken regarding the user, the like, or other.

Example system output components can also include a vehicle database. Output data can be provided to the database module 306, for instance, which can store such updates to an appropriate user account of the ancillary data 112.

Example communications and interactions are provided by the following chart:

| Context | Action |
| --- | --- |
| Vehicle receives text message via vehicle communication system (cellular or satellite, or V2I, for instance) directed to a third passenger 532. | Activity module 304, having data indicating that the third passenger is positioned in the third acoustic zone 530, determines to provide a notification of the text to only the third acoustic zone 530 (so other occupants don't or barely can hear it), such as by way of in-seat speakers for only the third-zone 530 seat. |
| Vehicle senses a voice requesting music. | Activity module 304, based on input from the sensor sub-system 60 (microphone in the respective zone/s), determines that the request was from a second occupant 522, and so either asks the occupant 522 what type of music they would like, via second-zone 520 speakers (so other occupants don't or barely can hear it), or provides music to the second zone 520 in a manner known preferred by the second occupant 522 - e.g., preferred |

-continued

| Context | Action |
| --- | --- |
| | station/channel and volume. |
| Activity module 304 determines that left-rear door is slightly ajar, and that the corresponding third user 532 is listening to music via their mobile device and earphones. | Activity module 304 may determine to notify the user via third-acoustic zone 530 speakers, such as in an intensifying manner and if the door is not closed, then to proceed to provide a message by another channel, such as via the mobile device 34 of the occupant 532 or by a screen particular to the occupant 532 - e.g., positioned on the back of the front left seat of the first zone 510. |
| Activity module 304 determines that each time that the fourth occupant 540 first receives music in their zone, they request a change of channel from channel "A" to channel "B" and turns up the volume from level 3 to 5. | Activity module 304 initiates, via the database module 306, storage of the apparent preference at a user profile for the fourth occupant 540 at the system; Activity module 304 may initiate storage of synchronizing of same preference to a fourth-occupant 540 profile stored at another device - e.g., user mobile device, or remote server 50; Activity module 304 implements the preference the next time the user requests music, delivering channel "B" at level 5 to whichever vehicle acoustic zone the person is determined to be sitting in at the time (the fourth zone 540 in the example of FIGS. 5 and 6. |
| Vehicle senses an occupant request for connection to a customer service system, like the OnStar system, such as for an emergency situation particular to the occupant. | Activity module 304 determines that the request was from the second zone 520, such a based on the request being picked up by the second-zone microphone (other zone microphones 510, 540 may have picked up the sound, but signal in 520 strongest); Activity module 504 advises customer-service center 50 that the second occupant 522 has an emergency situation (identifying for instance, the user name, account number, social-security number or other identification recognized by the remote center 50); and Activity module 304, based on a presently or pre-determined identify of the occupant in the second zone 520 as the second user 522, the activity module connects the second zone 520 with the customer service center for communications, such as via a cellular call using second zone 520 speaker and microphone(s). |
| Vehicle senses occupant 532 sitting in the third zone 530 requesting a cooler environment. | Activity module 504 initiates adjustment to vehicle HVAC system to cool the third zone 530, such as by increasing an HVAC fan effect or temperature effect for the third zone 530. |

VI. ADDITIONAL STRUCTURE, ALGORITHM FEATURES, AND OPERATIONS

In combination with any of the other embodiments described herein, or instead of any embodiments, the present technology can include any structure or perform any functions as follows:

i. The technology includes systems and methods for automatic availability and provision of acoustic zones for vehicles including autonomous driving and/or shared vehicle.
ii. The technology provides users with a customized experience in various ways including by assigning a vehicle acoustic zone to a particular user determined to be occupying the zone. The assignment may include assigning speakers and microphones corresponding to a zone to an identified user occupying the zone. Or linking identification of the zone-occupying user with the zone, and so thereby directly or indirectly linking the user to the zone-specific equipment (mic, speaker, etc.).
iii. System associates an occupant personal mobile device with a zone that the occupant is determined to be sitting in. The vehicle may communicate with the device via Bluetooth, for instance, if needed or preferred manner of communicating to the occupant.
iv. System can recognize user via voice or speech recognition, or other biometric recognition, and associate user with acoustic zone in vehicle in which they are determined present based on the biometric sensing and/or on another manner such as camera, seat weight sensor, or motion detection. In some embodiments, voice or speech programs are operated at the vehicle and/or at a remote device 50 (e.g. in the 'cloud'), such as spoken dialog, voice recognition, or voice-to-text conversion.
v. Customer-service center access enabled per occupant. For instance, an occupant can request connection to the OnStar system, such as for an emergency situation.
vi. System provides vehicle sounds such as chimes to only one or more select occupants, as appropriate under the circumstances—e.g., to only the passenger/s that should be notified of a present subject condition (e.g., their stop on a route approaching.
vii. System provides media to only one or more select occupants, as appropriate under the circumstances—e.g., to only the passenger that requested the media.
viii. System links occupant identify with intra-vehicle location—e.g., acoustic zone, and the link can be used in connection with any activity involving the occupant, such as determine that a statement made was made by the occupant, or deliver a system communication to the user via their present acoustic zone.
ix. System can provide the technology automatically upon the user(s) entering the vehicle.
x. Microphone-side processing can include:
   user location determination;
   speech detection, to identify a user and/or to process user output and associated same with the user, being received from their acoustic zone;
   interference reduction, to eliminate aural disturbance, such as by focusing speaker output in a subject zone and/or at other zones, to minimize interference for a subject user in the subject zone, or to minimize interference for more than one user at a time, or by reducing an HVAC fan to be quieter at least in connection with a subject zone, or to reduce, offset, or eliminate sound from other users or an acoustic echo, for instance. In some embodiments, interference reduction requires vehicle microphones and uses vehicle integrated acoustic processing.
   control of vehicle systems, such as HVAC or radio, specific to a requesting user. The Vehicle system change, e.g., HVAC or radio, can be made to affect only or especially the requesting user, focusing the change on that user's acoustic zone.
xi. Loudspeaker side processing:
   audio rendering, in a manner requested by a particular occupant and/or to a zone occupied by a requesting occupant.
   rendering alerts, prompts, notifications (e.g., chimes, vehicle synthetic voice message, etc.) specifically for an appropriate user, such as via speakers of the acoustic zone in which the user is present.
xii. In various embodiments, seat loudspeakers and at least one microphone are positioned at each zone.

VII. SELECT ADVANTAGES

Many of the benefits and advantages of the present technology are described above. The present section restates some of those and references some others. The benefits described are not exhaustive of the benefits of the present technology.

Vehicle user experience is enhanced by the personalization provided by the present technology.

The systems (A) identifying a user, (B) confirming that the user is an appropriate user (such as by checking security settings, an itinerary of bookings or manifest, etc.), (C) determining what zone the user occupies, and (D) interacting with the user based on the acoustic zone that they determined to be positioned in are various ways that the systems allow interactions with the user via personalized or general messages, and processes of user input from the user as being received from the particular user identified as being in that zone.

VIII. CONCLUSION

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure.

References herein to how a feature is arranged can refer to, but are not limited to, how the feature is positioned with respect to other features. References herein to how a feature is configured can refer to, but are not limited to, how the feature is sized, how the feature is shaped, and/or material of the feature. For simplicity, the term configured can be used to refer to both the configuration and arrangement described above in this paragraph.

Directional references are provided herein mostly for ease of description and for simplified description of the example drawings, and the thermal-management systems described can be implemented in any of a wide variety of orientations. References herein indicating direction are not made in limiting senses. For example, references to upper, lower, top, bottom, or lateral, are not provided to limit the manner in which the technology of the present disclosure can be implemented. While an upper surface is referenced, for example, the referenced surface can, but need not be vertically upward, or atop, in a design, manufacturing, or operating reference frame. The surface can in various embodiments be aside or below other components of the system instead, for instance.

Any component described or shown in the figures as a single item can be replaced by multiple such items configured to perform the functions of the single item described.

Likewise, any multiple items can be replaced by a single item configured to perform the functions of the multiple items described.

Variations, modifications, and combinations may be made to the above-described embodiments without departing from the scope of the claims. All such variations, modifications, and combinations are included herein by the scope of this disclosure and the following claims.

What is claimed is:

1. A system, for implementation at a vehicle of transportation, comprising:
a hardware-based storage device;
multiple arrangements of occupant-zone-specific acoustic equipment in the vehicle, wherein:
each arrangement is positioned at a respective occupant-specific acoustic zone of the vehicle;
each arrangement is configured to communicate with a processing unit that, when executing code of the hardware-based storage device in operation of the system, interacts, via the arrangement, only with a vehicle occupant occupying a corresponding occupant-specific acoustic zone; and
the hardware-based storage device comprising an activity module that, by way of the processing unit in operation of the system:
obtains first-occupant-identifying information in response to a first occupant booking use of the vehicle;
determines, based on the first-occupant-identifying information, a first identity, of a first vehicle occupant, occupying a first occupant-specific acoustic zone of the occupant-specific acoustic zones; and
associates, by the processing unit, in the storage device, the first identity determined with data indicating the first zone.

2. The system of claim 1, wherein each arrangement of occupant-zone-specific acoustic equipment includes a microphone for sensing sound from the occupant occupying the respective occupant-specific acoustic zone.

3. The system of claim 1, wherein each arrangement occupant-zone-specific acoustic equipment includes a speaker for providing sound to the respective occupant-specific acoustic zone.

4. The system of claim 1, further comprising the hardware-based storage device, wherein:
the multiple arrangements of occupant-zone-specific acoustic equipment include:
a first arrangement of occupant-zone-specific acoustic equipment, of the multiple arrangements of occupant-zone-specific acoustic equipment, positioned at a first occupant-specific acoustic zone of the occupant-specific acoustic zones; and
a second arrangement of occupant-zone-specific acoustic equipment, of the multiple arrangements of occupant-zone-specific acoustic equipment, positioned at a second occupant-specific acoustic zone of said occupant-specific acoustic zones; and
the storage device comprises an output-interface module that, by way of the processing unit in operation of the system, determines:
first-occupant output audio media to deliver by way of a first speaker, of the first arrangement, positioned at the first occupant-specific acoustic zone; and
second-occupant output audio media, distinct from the first-occupant output audio media, to deliver, simultaneously with provision of the first-occupant output audio media by way of the first speaker, by way of a second speaker, of the second arrangement, positioned at the second occupant-specific acoustic zone.

5. The system of claim 1, further comprising the hardware-based storage device, wherein:
the multiple arrangements of occupant-zone-specific acoustic equipment include:
a first arrangement of occupant-zone-specific acoustic equipment positioned at a first occupant-specific acoustic zone of the occupant-specific acoustic zones; and
a second arrangement of occupant-zone-specific acoustic equipment positioned at a second occupant-specific acoustic zone of the occupant-specific acoustic zones; and
the storage device comprises an input module that, by way of the processing unit in operation of the system, receives:
first-occupant input audio, from a first occupant, by way of a first microphone of the first arrangement; and
second-occupant input audio, from a second occupant, by way of a second microphone of the second arrangement.

6. The system of claim 5, wherein the hardware-based storage device comprises an activity module that, by way of the processing unit in operation of the system:
determines, based on the first-occupant input audio, first media to provide to a first speaker, of the first arrangement, positioned at the first occupant-specific acoustic zone; and
determines, based on the second-occupant input audio, second media to provide to a second speaker, of the second arrangement, positioned at the second occupant-specific acoustic zone.

7. The system of claim 6, wherein the first media is one of:
a telephone call initiated by the system and connected by way of a vehicle telecommunication system;
a telephone call initiated by the system and connected by way of an occupant portable communication device;
a telephone call initiated by the occupant portable communication device and connected by way of the vehicle telecommunication system;
a telephone call received at the vehicle by way of a vehicle telecommunication system; and
a telephone call received at the vehicle by way of the occupant portable communication device of the first occupant.

8. The system of claim 6, wherein:
the first-occupant input indicates a user-desire to initiate or answer a telephone call; and
the activity module initiates or answers the telephone call by way of a vehicle telecommunication system or an occupant portable communication device.

9. The system of claim 1, wherein the activity module, by way of the processing unit in operation of the system:
obtains second-occupant-identifying information;
determines, based on second occupant identity-indicating input and the second-occupant-identifying information, a second identity, of a second vehicle occupant, occupying the second occupant-specific acoustic zone of the occupant-specific acoustic zones; and
associates, by the processing unit, in the storage device, the second identity determined with data indicating the second zone.

10. The system of claim 9 wherein the second-occupant-identifying information is obtained from a remove server.

11. The system of claim 9, wherein the second-occupant-identifying information is obtained by the system in response to the second occupant booking use of the vehicle.

12. The system of claim 1 wherein the activity module is configured to, in determining the first identity of the first vehicle occupant occupying the first occupant-specific acoustic zone, determine the first identify based on first occupant identity-indicating input and the first-occupant-identifying information.

13. The system of claim 1 wherein the first-occupant-identifying information is obtained from a remove server.

14. A system, for implementation at a vehicle of transportation, comprising:
a hardware-based storage device;
multiple arrangements of occupant-zone-specific heating, ventilation, and air-conditioning (HVAC) output equipment in the vehicle, wherein:
each arrangement is positioned at a respective occupant-specific HVAC zone of the vehicle; and
each arrangement is configured to communicate with a processing unit that, when executing code of the hardware-based storage device, interacts, via the arrangement, primarily only with a vehicle occupant occupying a corresponding occupant-specific HVAC zone;
the hardware-based storage device comprises an activity module that, by way of the processing unit in operation of the system:
determines, based on a determined first identity, of a first vehicle occupant, occupying the first occupant-specific HVAC zone, a first manner by which to provide HVAC at the first occupant-specific HVAC zone; and
determines, based on a determined second identity, of a second vehicle occupant, occupying the second occupant-specific HVAC zone, a second manner by which to provide HVAC at the second occupant-specific HVAC zone.

15. The system of claim 14, wherein:
the multiple arrangements of occupant-zone-specific HVAC equipment include:
a first arrangement of occupant-zone-specific HVAC equipment positioned at a first occupant-specific HVAC zone of said occupant-specific HVAC zones; and
a second arrangement of occupant-zone-specific HVAC equipment positioned at a second occupant-specific HVAC zone of said occupant-specific HVAC zones;
the hardware-based storage device comprises an input module that, by way of the processing unit in operation of the system, receives:
first-occupant input audio, from a first occupant, by way of a first microphone at the first occupant-specific HVAC zone; and
second-occupant input audio, from a second occupant, by way of a second microphone at the second occupant-specific HVAC zone; and
the hardware-based storage device comprises an activity module that, by way of the processing unit in operation of the system:
determines, based on the first-occupant input audio, a first manner by which to provide HVAC at the first occupant-specific HVAC zone; and
determines, based on the second-occupant input audio, a second manner by which to provide HVAC at the second occupant-specific HVAC zone.

16. A system, for implementation at a vehicle of transportation, comprising:
multiple arrangements of occupant-zone-specific acoustic equipment, each arrangement being positioned, for operation of the system, at a respective occupant-specific acoustic zone of the vehicle;
a processing unit; and
a hardware-based storage device comprising:
a database module that, by way of the processing unit in operation of the system:
obtains a first occupant setting using a determined first identity of a first occupant at a first occupant-specific acoustic zone of the vehicle; and
obtains a second occupant setting using a determined second identity of a second occupant occupying a second occupant-specific acoustic zone of the vehicle; and
an activity module that, by way of the processing unit in operation of the system:
determines, based on the first identify, a manner by which to interact with the first occupant while the first occupant is positioned in the first occupant-specific acoustic zone; and
determines, based on the second identify, a manner by which to interact with the second occupant while the second occupant is positioned in the second occupant-specific acoustic zone;
wherein the first manner includes at least one manner selected from a group of manners consisting of:
a statement to make to the first occupant by way of the first arrangement of occupant-zone-specific acoustic equipment;
a question to ask of the first occupant by way of the first arrangement of occupant-zone-specific acoustic equipment;
a message to provide to the first occupant by way of the first arrangement of occupant-zone-specific acoustic equipment; and
a notification to provide to the first occupant by way of the first arrangement of occupant-zone-specific acoustic equipment.

17. A system, for implementation at a vehicle of transportation, comprising:
a hardware-based storage device;
multiple arrangements of occupant-zone-specific acoustic equipment in the vehicle;
wherein:
each arrangement is positioned at a respective occupant-specific acoustic zone of the vehicle; and
each arrangement is configured to communicate with a processing unit that, when executing code of a hardware-based storage device in operation of the system, interacts, via the arrangement, only with a vehicle occupant occupying a corresponding occupant-specific acoustic zone;
the hardware-based storage device comprises an activity module that, by way of the processing unit in operation of the system:
determines, based on first occupant identity-indicating input, a first identity, of a first vehicle occupant, occupying the first occupant-specific acoustic zone of the occupant-specific acoustic zones;
associates, by the processing unit, in the storage device, the first identity determined with data indicating the first zone; and
determines, based on the first identity, a first control setting or mode for use in controlling first-occupant heating, ventilation, and air conditioning (HVAC) output equipment positioned at the first occupant-specific acoustic zone.

18. The system of claim 17, wherein the first control setting or mode affects a manner by which the system interacts with a first occupant occupying the first occupant-specific acoustic zone.

19. A system, for implementation at a vehicle of transportation, comprising:
a hardware-based storage device;
multiple arrangements of occupant-zone-specific acoustic equipment in the vehicle, wherein:
each arrangement is positioned at a respective occupant-specific acoustic zone of the vehicle; and
each arrangement is configured to communicate with a processing unit that, when executing code of the hardware-based storage device in operation of the system, interacts, via the arrangement, only with a vehicle occupant occupying a corresponding occupant-specific acoustic zone;
wherein the hardware-based storage device comprises an activity module that, by way of the processing unit in operation of the system:
determines, based on first occupant identity-indicating input, a first identity, of a first vehicle occupant, occupying the first occupant-specific acoustic zone of the occupant-specific acoustic zones;
associates, by the processing unit, in the storage device, the first identity determined with data indicating the first zone;
the hardware-based storage device comprises a database module that, by way of the processing unit in operation of the system:
accesses, using the first identity, a first occupant setting; and
the activity module is configured to, by way of the processing unit in operation of the system:
determines, based on the first identity, a first control setting or mode for use in controlling a first arrangement of occupant-zone-specific acoustic equipment, of the multiple arrangements of occupant-zone-specific acoustic equipment, being positioned at the first occupant-specific acoustic zone, the first control setting or mode affecting a manner by which the first media is provided for consumption by a first occupant occupying the first occupant-specific acoustic zone.

* * * * *